US010623961B1

(12) United States Patent
Manepalli et al.

(10) Patent No.: US 10,623,961 B1
(45) Date of Patent: Apr. 14, 2020

(54) USING A CHANGE IN INFORMATION ASSOCIATED WITH A MOBILE DEVICE NETWORK ID AS A RISK INDICATOR IN MOBILE NETWORK-BASED AUTHENTICATION

(71) Applicant: ZUMIGO, INC., San Jose, CA (US)

(72) Inventors: Harish Manepalli, San Jose, CA (US); Chirag C. Bakshi, San Jose, CA (US); Venkatarama Parimi, Dublin, CA (US); Lyndi Rebecca Long, Plant City, FL (US)

(73) Assignee: ZUMIGO, INC., San Jose, CA (US)

( * ) Notice: Subject to any disclaimer, the term of this patent is extended or adjusted under 35 U.S.C. 154(b) by 0 days.

(21) Appl. No.: 16/216,637

(22) Filed: Dec. 11, 2018

(51) Int. Cl.
*H04M 1/66* (2006.01)
*H04W 12/08* (2009.01)
*H04W 12/06* (2009.01)
*H04W 12/00* (2009.01)
*G06Q 20/40* (2012.01)
*H04W 8/26* (2009.01)

(52) U.S. Cl.
CPC .... *H04W 12/0802* (2019.01); *G06Q 20/4016* (2013.01); *H04W 12/0051* (2019.01); *H04W 12/00505* (2019.01); *H04W 12/06* (2013.01); *H04W 8/26* (2013.01)

(58) Field of Classification Search
CPC ......... H04W 12/0802; H04W 12/0051; H04W 12/00505; H04W 12/06; H04W 8/26; G06Q 20/4016; G06F 16/2329; G06F 17/30; G06F 21/335; G06F 21/35; G06F 21/40; G06F 21/31; H04B 7/005; H04L 63/083

USPC .............. 455/411, 406, 452.1; 370/280, 329; 726/1, 7
See application file for complete search history.

(56) References Cited

U.S. PATENT DOCUMENTS

| | | | | | |
|---|---|---|---|---|---|
| 7,298,327 | B2 * | 11/2007 | Dupray | .................. | G01S 1/026 342/451 |
| 7,373,515 | B2 * | 5/2008 | Owen | .................... | G06F 21/31 713/182 |
| 7,640,574 | B1 * | 12/2009 | Kim | ........................ | G06F 21/31 726/1 |
| 2001/0037451 | A1 * | 11/2001 | Bhagavatula | ......... | G06F 21/445 713/155 |

(Continued)

OTHER PUBLICATIONS

Marforio et al. "Smartphones as Practical and Secure Location Verification Tokens for Payments," NDSS 2014, Feb. 22, 2014, 15 pages.

*Primary Examiner* — Mahendra R Patel
(74) *Attorney, Agent, or Firm* — Kim & Stewart LLP

(57) ABSTRACT

The network ID of a mobile device can be securely employed as a possession factor. When an access to a restricted access application server or a restricted access account on the application server is attempted via a computing device, and possession of a mobile device programmed with a network ID is employed as a verification factor, the application server or a network ID monitoring server can determine whether certain information associated with the network ID has been changed within a predetermined time interval, indicating potentially fraudulent activity. Based on the presence or absence of recent changes in the information associated with the network ID, the user activity is either authorized or denied.

8 Claims, 3 Drawing Sheets

(56) References Cited

U.S. PATENT DOCUMENTS

| | | | | |
|---|---|---|---|---|
| 2002/0091745 | A1* | 7/2002 | Ramamurthy | G06F 21/62 |
| | | | | 718/100 |
| 2004/0225880 | A1* | 11/2004 | Mizrah | G06F 21/46 |
| | | | | 713/155 |
| 2005/0268107 | A1* | 12/2005 | Harris | G06F 21/31 |
| | | | | 713/182 |
| 2006/0070125 | A1* | 3/2006 | Pritchard | G06F 21/31 |
| | | | | 726/18 |
| 2006/0136740 | A1* | 6/2006 | Smith | G06F 21/31 |
| | | | | 713/184 |
| 2007/0033649 | A1* | 2/2007 | Henriksen | G06F 21/34 |
| | | | | 726/20 |
| 2011/0165892 | A1* | 7/2011 | Ristich | H04W 64/00 |
| | | | | 455/456.2 |
| 2011/0231914 | A1* | 9/2011 | Hung | G06F 21/335 |
| | | | | 726/7 |
| 2018/0166176 | A1* | 6/2018 | Flippen | A61B 5/7465 |

* cited by examiner

| NETWORK ID 201 | USER NAME 202 | ACTIVATION DATE 203 | USER ADDRESS 204 | ACTIVATION DATE 205 | OTHER INFO. 206 | ACTIVATION DATE 207 | VERIFICATION QUERY DATE 208 |
|---|---|---|---|---|---|---|---|
| XXX-YYY-ZZZ1 | Darrel Johnson | 2018.08.31 | 1535 Monroe St | 2018.08.31 | 0235-123669 | 2018.08.31 | 2018.08.31 |
| | Susan McAbe | 2018.08.31 | 120 S. Bowers | 2018.08.31 | 1434-763344 | 2018.08.31 | 2018.08.31 |
| | Donald Johnson | 2018.08.31 | 3355 Walsh Ave | 2018.08.31 | 5490-003427 | 2018.08.31 | 2018.08.31 |
| | Richard Smith | 2018.09.01 | 5655 22$^{nd}$ Ave | 2018.09.01 | 0144-274503 | 2018.09.01 | 2018.09.01 |
| | Barbara Jones | 2018.09.02 | 705 Main St. | 2018.09.02 | 5490-600342 | 2018.09.02 | 2018.09.01 |
| | | | | | | | 2018.09.02 |
| | | | | | | | 2018.09.02 |
| | | | | | | | 2018.09.02 |
| XXX-YYY-ZZZ2 | Randal Swain | 2015.04.15 | 110 25$^{th}$ Ave. | 2016.04.15 | 0010-076658 | 2016.04.15 | 2018.07.20 |
| | | | 222 Main St. | 2016.01.20 | | | 2018.08.02 |
| | | | 123 Park Ave. | 2017.02.02 | | | 2018.08.31 |
| | | | 2535 Palmdale | 2017.09.08 | | | 2018.09.02 |
| | | | 603 S. 240$^{th}$ St. | 2018.04.21 | | | |
| XXX-YYY-ZZZ3 | Mehdi Abed | 2018.09.02 | 7252 26$^{th}$ Ave N | 2018.09.02 | 4503-005490 | 2018.09.02 | |
| | Fei Zhang | 2018.09.03 | 455 Red Ln. | 2018.09.02 | 0214-274503 | 2018.09.02 | |
| | Hans Schwartz | 2018.09.03 | 255 Main St. | 2018.09.02 | 3350-450342 | 2018.09.02 | |

FIG. 2

USING A CHANGE IN INFORMATION ASSOCIATED WITH A MOBILE DEVICE NETWORK ID AS A RISK INDICATOR IN MOBILE NETWORK-BASED AUTHENTICATION

BACKGROUND OF THE INVENTION

Field of the Invention

Embodiments of the present invention generally relate to wireless tele-communication systems and, more specifically, to systems and methods for using a change in information associated with a mobile device network ID as a risk indicator in mobile network-based authentication.

Description of the Related Art

It has become common practice for possession of a mobile device to be employed as an authentication factor for login to an account or website associated with sensitive information. For example, when logging in to a bank account or transferring funds from the bank account via an application on a mobile device, a user may be required to confirm possession of an authorized mobile device that is linked to the bank account. In some instances, possession of the authorized mobile device is verified when the user enters a one-time password (OTP) that is sent via text message to the authorized mobile device. Alternatively, when a user attempts to access a bank account via a mobile device, access may be restricted to the authorized mobile device that is linked to the bank account. In such instances, technologies are employed that determine the mobile number of the mobile device interacting with an application or website, and report that mobile number to the bank. Thus, the bank can confirm that the bank account is being accessed by the authorized mobile device.

However, if a fraudster can obtain access to a victim's bank account, such as by learning or guessing the account password, or by intercepting an OTP that enables a password reset, possession of a mobile device that is linked to the bank account can be defeated as an authentication factor. For example, the fraudster with access to the victim's bank account can transfer funds directly from the compromised account using a conventional person-to-person app by opening a mobile account for a pre-paid cell phone in the victim's name and adding the pre-paid cell phone number to the authorized mobile devices that are associated with the compromised account. This approach can succeed because conventional authorization technologies that can verify the user name associated with a particular mobile device will detect that the victim's name is associated with the pre-paid cell phone performing the sensitive transaction, and therefore authorize it. In this way, a fraudster can remove funds from a compromised bank account without the need for falsified personal identification or the risk of physically entering a bank.

SUMMARY OF THE INVENTION

According to one or more embodiments, changes in information associated with a particular mobile telephone number ("mobile number") or network identification (ID) is tracked to facilitate detection of risk indicators associated with the mobile number by an application server or other authentication entity. That is, when access to a secure account is requested from a computing device and possession of a mobile device that is programmed with the network ID is employed as a verification factor, access to the account is authorized based on whether certain information associated with the network ID has changed within a predetermined time interval. Examples of such changes of information associated with the network ID include a change in a user name for a mobile account associated with the network ID, a change in an address for a mobile account associated with the network ID, a change in a number of identity verification queries that have been performed with respect to the network ID, and the like. Such changes in information generally occur prior to fraudulent activity, therefore the occurrence of these changes shortly before a sensitive transaction is attempted by a mobile device programmed with the network ID can be considered an authentication risk factor. According to various embodiments described herein, the detection of such changes in information can indicate that a sensitive transaction should not be authorized, or only authorized upon successful completion of additional verification processes. As a result, fraudulent activity associated with the network ID for a mobile device can be detected, and use of the network ID as an indicator of possession of a particular mobile device is more secure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 shows a network ID information database, according to one or more embodiments of the present invention.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
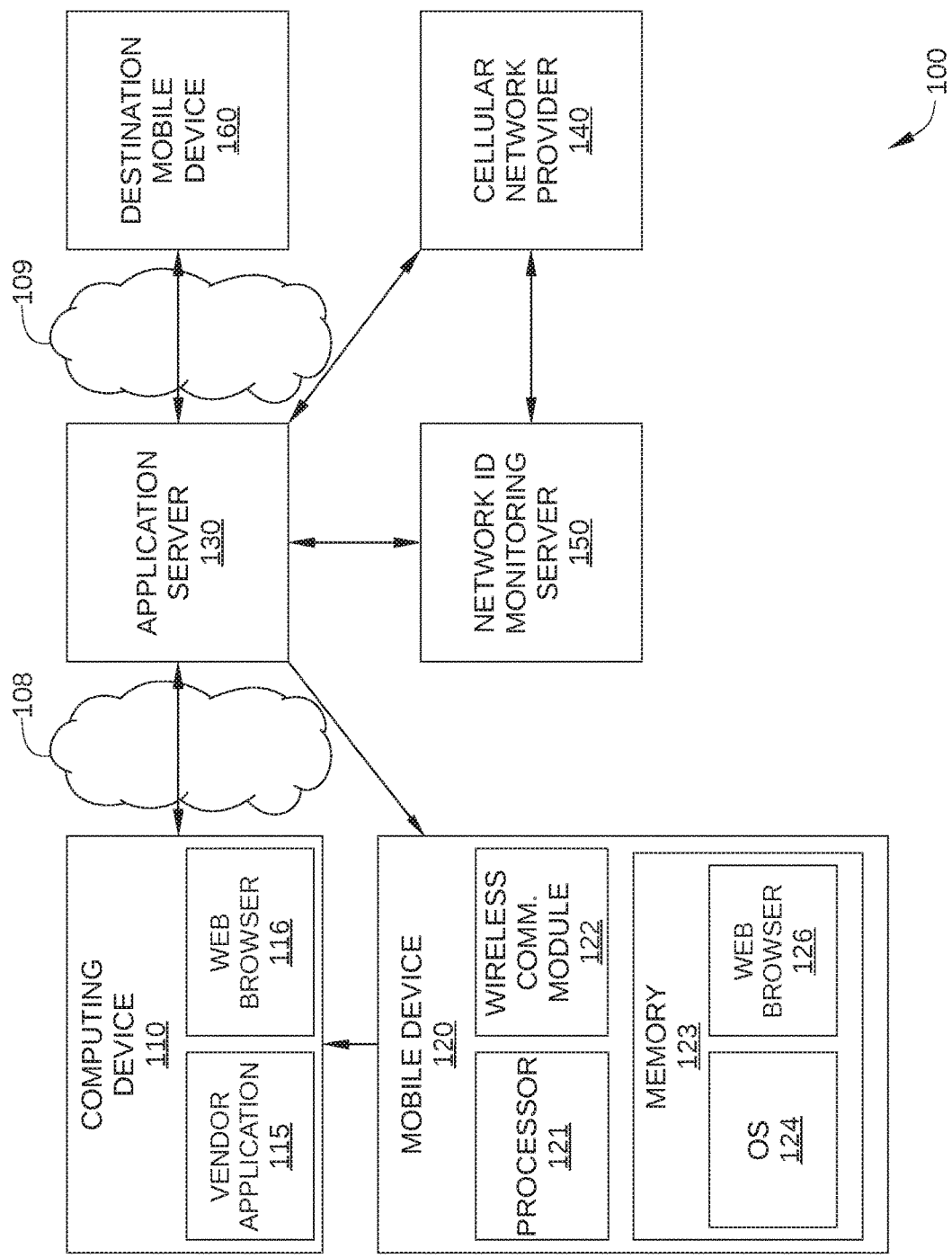
FIG. 1 is a block diagram of a wireless communication system, according to one or more embodiments of the present invention.

FIG. 1 is a block diagram of a mobile identity verification system 100, according to one or more embodiments of the present invention. As described below, mobile identity verification system 100 enables changes in information associated with a network identification (ID) or mobile number to be used as a risk indicator in mobile network-based authentication. Consequently, the reliability and security of using the mobile number as an authentication factor is enhanced. More specifically, detected changes in information associated with a network ID informs an application server or other authentication entity that the network ID may be employed in a fraudulent attempt to initiate a user activity associated with a restricted-access account, such as transferring funds from a victim's bank account. For example, in some embodiments, a user initiates a user activity with a computing device, such as logging in to a secure account associated with an application server, or initiating a person-to-person transfer of funds from such a secure account. In such embodiments, possession of a mobile device programmed with a network ID is employed as a verification factor for authorization of the user activity being initiated. In such embodiments, the application server enables access to the secure account or otherwise authorizes the user activity based on whether changes in certain information associated with the network ID of the mobile device have occurred within a predetermined time interval.

Mobile identity verification system 100 includes a computing device 110, a mobile device 120 (such as a cellular telephone or smartphone), an application server 130, a cellular network provider 140, a network ID monitoring server 150, and, in some embodiments, a destination mobile device 160. Computing device 110 is communicatively coupled to application server 130 by at least a wireless communication network 108 and application server 130 is communicatively coupled to destination mobile device 160 by at least a wireless communication network 109. Wireless communication network 108 and wireless communication network 109 can each include a wireless local area network (WLAN), a cellular network, or a combination of both. Furthermore, while computing device 110 is shown in FIG. 1 to be communicatively coupled to application server 130 by wireless communication network 108 and application server 130 is shown in FIG. 1 to be communicatively coupled to destination mobile device 160 by wireless communication network 109, in other embodiments, one or more additional communication networks may also be employed to communicatively couple computing device 110, mobile device 120, application server 130, and destination mobile device 160, such as the Internet, among others.

The WLAN included in wireless communication network 108 and/or wireless communication network 109 enables compatible devices to connect to the Internet via a wireless access point, or "hotspot." For example, in some embodiments, the WLAN is a WiFi network that includes one or more devices based on the Institute of Electrical and Electronics Engineers (IEEE) 802.11 standard. Thus, any suitably configured wireless communication device that can connect to the WLAN, such as a smartphone with WiFi capability, can perform data transfer to and from the Internet. The cellular network included in wireless communication network 108 and/or wireless communication network 109 enables two-way wireless communication with wireless subscriber terminals, such as mobile device 120 or destination mobile device 160. For example, in some embodiments, the cellular network includes one or more base stations (not shown) that are in two-way wireless communication with wireless subscriber terminals, and with a landline system (not shown), such as the public switched telephone network (PSTN) or any other wired network capable of voice/data connections. When an active call associated with mobile device 120 or destination mobile device 160 is underway in the cellular network, a suitable base station translates a forward trunk signal in the landline system to a properly formatted radio signal, which is transmitted by an antenna to mobile device 120 over an air interface. Mobile device 120 or destination mobile device 160 then performs complementary operations to enable the two-way voice or data traffic over the air interface.

Computing device 110 can be any technically feasible and network-connected computing device. For example, computing device 110 can be a desktop computer, laptop computer, smartphone, personal digital assistant (PDA), tablet computer, or any other type of computing device that is configured to receive input, process data, and display images, and is suitable for practicing one or more embodiments of the present invention. Thus, computing device 110 is configured to execute a vendor application 115, a web browser 116, and/or other software applications. In addition, computing device 110 is configured to communicate with application server 130, for example via web browser 116.

Vendor application 115 is a computer program designed to run on computing device 110. Vendor application 115 is installed and executed in computing device 110 to facilitate interactions with a particular website, such as application server 130, a particular database, or some other computing device. For example, in some embodiments, vendor application 115 is a banking application, a navigational program, an application that facilitates online purchasing of entertainment media from a specific website, etc.

Mobile device 120 can be a cellular telephone (also referred to as a wireless subscriber terminal), a smart phone, a personal digital assistant (PDA), a tablet computer, or any other mobile computing device configured to wirelessly access wireless communication network 108, and to practice one or more embodiments of the present invention. To that end, in some embodiments, mobile device 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with wireless communication network 108. Thus, in some embodiments, wireless communication module 122 includes cellular capability and WiFi capability, among others. Alternatively or additionally, in some embodiments, wireless communication module 122 includes Bluetooth capability. Memory 123 can include any suitable volatile and/or nonvolatile memory (e.g., random-access memory (RAM), read-only memory (ROM), flash memory, a magnetic hard drive, etc.), and is configured to store instructions, data, an operating system (OS) 124, and/or a web browser 126, etc.

OS 124 supports the functions of processor 121, including scheduling tasks and sending commands to vendor application 125, memory 123, and wireless module 122, managing the power state of mobile device 120, initiating execution of applications on processor 121, managing sockets and TCP connections, and the like. For example, in some embodiments, OS 124 is configured to facilitate the execution of web browser 126 and/or other software applications. In some embodiments, computing device 110 and mobile device 130 can be the same computing device. In such embodiments, mobile device 120 can be used to initiate a sensitive transaction with application server 130, and possession of mobile device 120 can be used as an authentication factor for the sensitive transaction.

Application server 130 can be any entity that can be accessed by mobile device 120 via a WiFi network and can benefit from identification and/or authorization of a user prior to access by the user. More specifically, application server 130 can be any entity that provides access to a vendor website or to sensitive information. Alternatively or additionally, application server 130 enables important data and/or financial transactions. Application server 130 can be implemented as a website, an application, a server, a database, an application running on an instance of virtual machine, and the like. Thus, in some embodiments, application server 130 is a public or open server, whereas in other embodiments, application server 130 is a restricted access only server. For example, in some embodiments, application server 130 can be a restricted access server, a merchant server, a vendor website, an e-mail server or application that enables interaction with an e-mail server, a banking website, a cloud storage server, and the like. Thus, the restricted access server can be any computing device, application, or other entity that can be accessed by computing device 110 via vendor application 115 or web browser 116. As noted above, vendor application 115 is configured to facilitate access to and interactions with application server 130, such as banking transactions and person-to-person fund transfers from a bank account associated with application server 130 to a user of destination mobile device 160.

Application server 130 stores and/or provides access to sensitive information and/or enables important data and/or financial transactions. As such, interactions with application server 130, particularly online interactions, generally require authentication, and can require two-factor authentication. For instance, in some embodiments, a knowledge factor (for example a user-entered personal identification number or passcode) and a possession factor (for example possession of mobile device 120) are employed by application server 130 to approve user access to application server 130 via computing device 110 or to initiate a sensitive transaction with computing device 110, such as a person-to-person fund transfer. That is, user access to application server 130 via computing device 110 is not approved unless a two-factor authentication process is successfully completed in which a knowledge factor and a possession factor are verified. For example, suitable knowledge factors include a user-entered personal identification number (PIN) or passcode/password. A suitable possession factor is possession of mobile device 120, where possession is indicated by electronic confirmation that the network ID programmed on the mobile device 120 performing the current interaction with application server 130 corresponds to a phone number associated with the account being accessed on application server 130. Further, according to various embodiments described herein, the authentication process is not completed when certain information associated with the network ID programmed on the mobile device 120 are determined to have been changed during a predetermined time interval.

Cellular network provider 140 represents one or more computing devices or servers included in cellular network 102 that are employed by the provider of cellular network 102 for communicating control, status, and signaling information between nodes in cellular network 102. In some embodiments, cellular network provider 140 is included in a Signaling System 7 (SS7) network. In some embodiments, cellular network provider 140 includes the capability of cellular network 102 to allocate Internet protocol (IP) addresses to mobile devices 120 and to map currently allocated IP addresses to the mobile numbers of mobile devices 120.

Destination mobile device 160 may be a mobile device (or other computing device) that receives information from application server 130 as part of a transaction or other interaction initiated by mobile device 120. For example, in some embodiments, destination mobile device 160 is a mobile device that receives fund transfer information 101 from application server 130 as part of a person-to-person fund transfer from an account associated with application server 130, where the user of computing device 110 (or mobile device 120) initiates the person-to-person fund transfer. When the person-to-person fund transfer is determined to be an authorized interaction by a suitable authorization entity (e.g., application server 130 and/or network ID monitoring server 150), application server 130 transmits fund retrieval information 101, such as a web link, to destination mobile device 160. The web link or other fund retrieval information 101 may be contained in an e-mail, a short message service (SMS) text message, and the like. Destination mobile device 160 can be any suitable computing device. When destination mobile device 160 is a mobile device, mobile device 160 may be configured similarly to mobile device 120, and include a processor, a wireless communication module, a memory, etc.

Network ID monitoring server 150 may be a computing device or an application that runs on a server or other computing device coupled to the Internet or other communications network, where the computing device or application is configured to execute network ID monitoring operations as described herein. Such operations can include tracking/updating an information change history and/or a verification query history for each of a plurality of network IDs (mobile telephone numbers). In some embodiments, network ID monitoring server 150 is further configured to determine whether a transaction (or other access) to server application 130 is an authorized transaction/access or an unauthorized transaction/access. Network ID monitoring server 150 makes such a determination when the transaction (or other access) to server application 130 is initiated by a computing device 110, and possession of a mobile device 120 programmed with a particular network ID is an authentication factor for such a transaction. Alternatively, in some embodiments, network ID monitoring server 150 is configured to provide recent changes of information associated with a certain network ID to server application 130 (or to another suitable authorization entity) when such a transaction or access is initiated by computing device 110. In such embodiments, based on the changes of information associated with the network ID provided by network ID monitoring server 150, server application 130 can determine whether the transaction or access to server application 130 is an authorized transaction/access or an unauthorized transaction/access.

In operation, network ID monitoring server 150 facilitates authorization of a user activity that employs the mobile number of mobile device 120 as an authentication factor. Specifically, network ID server 150 verifies that changes in information associated with a network ID that can be considered risk factors for authentication have not occurred within a predetermined time period. For example, in some embodiments, network ID monitoring server 150 maintains a network ID information database 151 that includes previous and current versions of user information for each of a plurality of network IDs for mobile devices. Alternatively or additionally, in some embodiments, network ID information database 151 includes verification query history information associated with each of the plurality of network IDs. Consequently, when a user performs an activity with a mobile device that requires authentication based on a network ID of the mobile device, such as an online access or a person-to-person fund transfer, risk indicators associated with the mobile number can be detected by an authorization entity and acted on accordingly. One embodiment of network ID information database 151 is described below in conjunction with FIG. 2.

FIG. 2 shows network ID information database 151, according to one or more embodiments of the present invention. In FIG. 2, network ID information database 151 is represented as a table that includes previous and current versions of user information for each of a plurality of network IDs 201 and/or a verification query history 290 for each of the plurality of network IDs 201. As shown, network ID information database 151 includes a user information history 210 for mobile number XXX-YYY-ZZZ1, a user information history 220 for mobile number XXX-YYY-ZZZ2, and a user information history 230 for mobile number XXX-YYY-ZZZ3. By way of illustration, in FIG. 2 only three device histories 210, 220, and 230 are shown, each corresponding to a specific network ID 201. In practice, network ID information database 151 can include a different device history for hundreds of thousands or more of network IDs 201.

Each network ID 201 is a network ID, such as a mobile telephone number that is provided by a wireless cellular network provider 140, and is associated with a single mobile device 120. It is noted that a particular network ID 201 can be ported to another mobile device 120, and therefore may not be permanently associated with a particular mobile device 120.

Each user information history maps a corresponding network ID 201 to one or more user names 202 and an activation date 203 for each such user name 202. Each user name 202 is a user name that has been associated with that particular network ID 201, for example by a cellular network provider 140. Each activation date 203 indicates a date (or date/time combination) at which the corresponding user name 202 was associated with the network ID 201. Typically, a new user name 202 is associated with a particular network ID 201 when a customer of a cellular network provider 140 opens a mobile account with a new mobile telephone number, and does not port an existing number to the new account. However, a new user name 202 is also associated with a particular network ID 201 when a fraudster opens a mobile account and then adds a potential victim's name to the mobile account. Thus, frequent changes of user name 202 with a particular network ID 201 can indicate that a fraudster is the actual user of the mobile device that is programmed with that network ID 201. By tracking changes of user name 202 with a particular network ID 201 and the activation date 203 for each such user name 202, network ID information database 151 enables detection of potentially fraudulent activity associated with a particular network ID 201. For example, user information history 210 (for mobile number XXX-YYY-ZZZ1) shows many recent changes in user names 202, user addresses 204, and other information 206. In addition, a large number of identity verifications have been tracked for mobile number XXX-YYY-ZZZ1 over a three-day period. Thus, mobile number XXX-YYY-ZZZ1 is likely a network ID that is employed by a fraudster to access victim's accounts.

Alternatively or additionally, in some embodiments, each user information history maps a corresponding network ID 201 to one or more user addresses 204 and an activation date 205 for each such user address 204. Similar to user names 202, each user address 204 is a user address that has been associated with that particular network ID 201, for example by a cellular network provider 140. Each activation date 205 indicates a date (or date/time combination) at which the corresponding user address 204 was associated with the network ID 201. Typically, a new user address 204 is also associated with a particular network ID 201 when a customer of a cellular network provider 140 opens a mobile account with a new mobile telephone number, and does not port an existing number to the new account. Similar to user names 202, a new user name 202 is associated with a particular network ID 201 when a fraudster opens a mobile account and then adds a potential victim's address to the mobile account. Thus, frequent changes of user address 204 with a particular network ID 201 can indicate that a fraudster is the actual user of the mobile device that is programmed with that network ID 201. By tracking changes of user address 204 associated with a particular network ID 201 and the activation date 205 for each such user address 204, network ID information database 151 enables detection of potentially fraudulent activity associated with a particular network ID 201.

Alternatively or additionally, in some embodiments, each user information history maps a corresponding network ID 201 to other user information 206 and an activation date 207 for each instance in which that user information 206 for the network ID 201 is updated. Examples of other user information 206 include bank account information associated with the network ID 201, cellular network provider information associated with the network ID 201, and/or any other suitable user-specific information that may be associated with network ID 201.

Alternatively or additionally, in some embodiments, each user information history maps a corresponding network ID 201 to a verification query history 290 that includes one or more verification query dates 208 that indicate a date or date/time that an identity verification query has been performed associated with that particular network ID 201. Frequent and/or repeated identity verification queries for a single network ID 201 are generally associated with a fraudster attempting to penetrate security for accounts that have been associated with that network ID 201. Thus, by tracking verification query dates 208 with a particular network ID 201, network ID information database 151 enables detection of potentially fraudulent activity associate with a particular network ID 201.

In some embodiments, network ID information database 151 can include user information across multiple cellular network providers 140. This is because network ID monitoring server 150 generally receives identity verification queries that can reference a mobile device 120 that is associate with any of a plurality of different cellular network providers 140.

Figure 3:
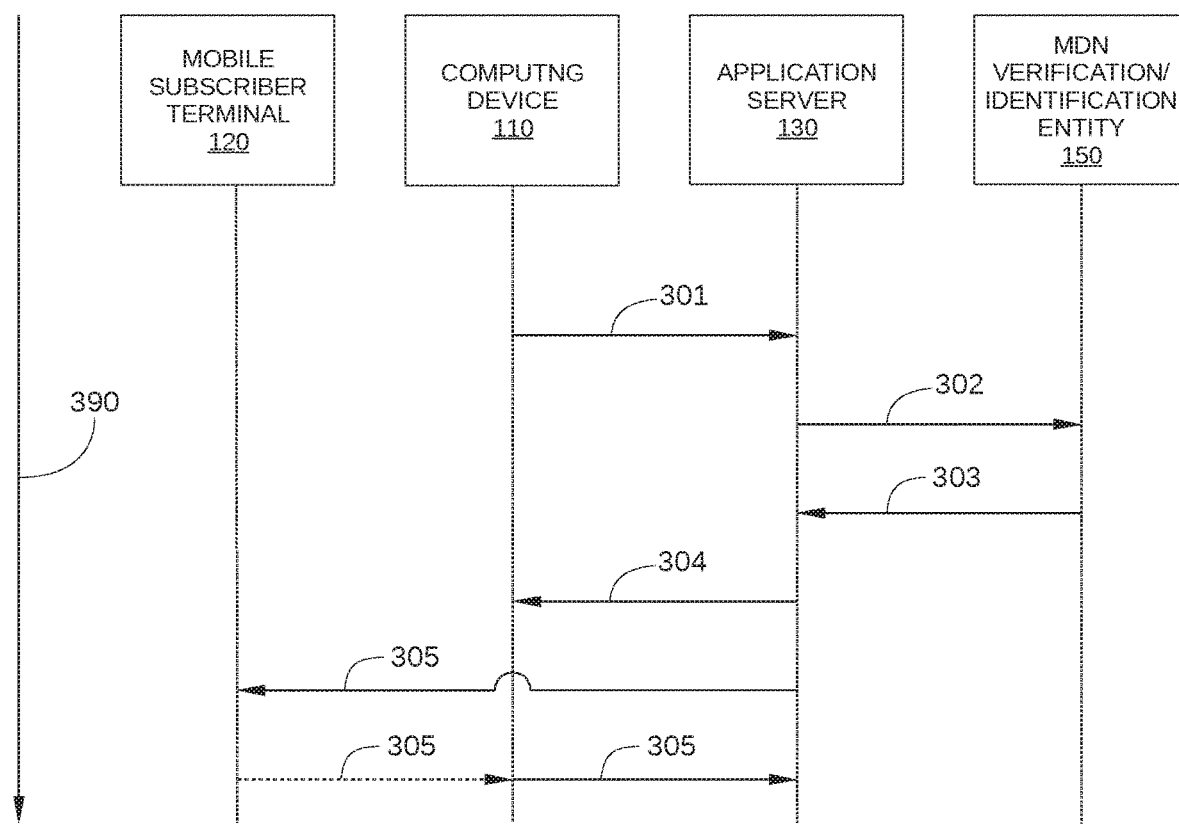
FIG. 3 schematically illustrates the steps performed by the wireless communication system of FIG. 1 as the steps occur sequentially along a time line, according to one or more embodiments of the invention.

FIG. 3 schematically illustrates the steps performed by mobile identity verification system 100 as the steps occur sequentially along a time line 390, according to one or more embodiments of the invention. As noted above, when a user attempts to access a restricted-access account associated with application server 130 (or otherwise initiate a sensitive transaction with application server 130) via a computing device 110, and possession of a mobile device 120 programmed with a network ID is an authentication factor for such an access, mobile identity verification system 100 provides to application server 130 a history of changes to information associated with the network ID. In such embodiments, application server 130 can then determine whether to authorize the access. Alternatively, in some embodiments, mobile identity verification system 100 provides to application server 130 an authorization of the network ID to perform the sensitive transaction based on the history of changes to information associated with the network ID. In such embodiments, network ID monitoring server 150 is configured to determine whether to authorize the access.

When a user attempts to initiate an online transaction or otherwise interact with application server 130, vendor application 125 or web browser 126 transmits a login request 301 to application server 130 in order to login or otherwise access application server 130. For example, after a connection is established between computing device 110 and application server 130 via wireless communication network 108, a user may select an icon displayed on a display device of computing device 110 to initiate login request 301. The icon may be displayed by, for example, vendor application 115 or web browser 116 running on computing device 110. In some embodiments, the network ID of mobile device 120 is included in login request 301. In some embodiments, login request 301 initiates a verification process which, if successfully completed, enables application server 130 to initiate a person-to-person fund transfer from an account associated with application server 130.

Application server 130 then transmits a request for authorization information 302 to network ID monitoring server 150 for the network ID programmed on the mobile device 120 associated with the account referenced in login request 301. Request for authorization information 302 generally includes user information associated with the restricted-access account that mobile device 120 is attempting to access or interact with. For example, request for authorization information 302 may include a user name and/or a user address for the restricted-access account, and/or other information associated with the restricted-access account.

In embodiments in which login request 301 includes the network ID activated on mobile device 120, such as when cellular network provider 140 includes the network ID in header information of data traffic associated with login request 301, application server 130 extracts the network ID from login request 301 in an appropriate procedure. In embodiments in which login request 301 does not explicitly include the network ID activated on mobile device 120, application server 130 can query a cellular network provider 140 associated with wireless communication network 108 for the network ID based on an Internet Protocol (IP) address included in login request 301. Alternatively, in such embodiments, application server 130 can query a mobile device identification server for the network ID based on the IP address included in login request 301. One example of such a mobile device identification server is described in detail in U.S. Patent Publication Ser. No. 16/102,624, filed Aug. 13, 2018 and entitled "Mobile Number Verification for Mobile Network-Based Authentication," which is incorporated herein by reference in its entirety.

Upon receipt of request for authorization information 302 from application server 130, network ID monitoring server 150 determines whether information associated with the network ID of interest exists in network ID information database 151, and whether such information has changed within a predetermined time interval. The time interval can be of any suitable duration (e.g., hours, days, or longer), and there can be different time intervals for different categories of information that has changed. For example, several changes in one week for user name 202 or user address 203 (see FIG. 2) for a particular network ID 201 may be considered a risk indicator, while several verification queries occurring within a single week for one particular network ID 201 may not be considered a risk indicator.

After determining whether information associated with the network ID of interest has changed within a predetermined time interval, network ID monitoring server 150 returns authorization notification 303 to application server 130. In some embodiments, authorization notification 303 indicates that the network ID of interest is either authorized or not authorized to initiate login request 301. In such embodiments, network ID monitoring server 150 is configured to determine whether the current user activity associated with login request 301 is authorized based on the changes (or lack thereof) within a predetermined time interval of information associated with the network ID. Alternatively or additionally, in some embodiments, authorization notification 303 includes one or more change indicators that each inform application server 130 of a specific change of information associated with the network ID of interest in network ID information database 151. In such embodiments, instead of network ID monitoring server 150, application server 130 is configured to determine whether the current user activity associated with login request 301 is authorized based on the specific changes of information (or lack thereof) within a predetermined time interval of information associated with the network ID. The specific change or changes of information are provided to application server 130 via the one or more change indicators included in authorization notification 303. That is, application server 130 employs the one or more specific changes of information associated with the network ID as a risk indicator for the network ID. Some examples of changes of information that may be indicated in authorization notification 303 are a change of user name, a change of user address, a verification query history (in which a number of identity verification queries within a certain time interval has changed), and the like. Any suitable encoding or indication convention can be employed in authorization notification 303 to indicate or describe what type and/or frequency of changes of information associated with the network ID have been determined by network ID monitoring server 150.

In some embodiments, based on authorization notification 303, application server 130 transmits a login request response 304 to computing device 110, indicating whether or not the requested user activity is authorized. If yes, the user of that computing device 110 can interact with application server 130 normally; if no, application server 130 prevents mobile device 120 from performing the current user activity with respect to application server 130. In some embodiments, based on authorization notification 303, application server 130 may perform other actions when login request 301 is determined to be an authorized request. For example, when login request 301 initiates a person-to-person funds transfer, application server 130 may transmit fund retrieval information 101 (shown in FIG. 2) to destination mobile device 160.

In some embodiments, in response to authorization notification 303 indicating that the requested user activity is authorized or application server 130 determines that the requested user activity is authorized, application server 130 transmits an OTP 305 or other pass code to the mobile device 120 programmed with the network ID for which changes of associated information have been checked. In such embodiments, transmission of OTP 305 enables verification of possession of mobile device 120 by the user requesting the user activity. Specifically, when the user requesting the user activity is in possession of that mobile device 120, the user receives OTP 305 via mobile device 120, and enters OTP 305 in an appropriate manner, for example via a pop-up window or dialogue box displayed by vendor application 115 or web browser 116. OTP 306 is then transmitted to application server 130. Upon receipt of OTP 305 from computing device 110, the user of computing device 110 can interact with application server 130 normally.

By performing the steps in FIG. 3, mobile identity verification system 100 enhances the security of using a network ID as a possession factor for a particular mobile device 120, since suspicious activity associated with that network ID can be detected prior to authorizing a user activity with that network ID.

In the embodiments described above, network ID monitoring server 150 maintains and updates network ID information database 151. Alternatively, in some embodiments, some or all of the information included in network ID information database 151 of FIG. 2 can be maintained and updated by application server 130. In such embodiments, application server 130 performs some or all of the operations described above performed by network ID monitoring server 150.

In sum, embodiments described herein enable a network ID of a mobile device to be securely employed as a possession factor. Consequently, the embodiments provide a technical solution to the problem of a fraudster being able to open a mobile account in the name of a potential victim, and use the network ID associated with that account as an authentication factor. Specifically, when an access to a restricted access application server or a restricted access account on the application server is attempted via a computing device, and possession of a mobile device programmed with a network ID is employed as a verification factor, an authorization entity (e.g., the application server or a network ID monitoring server) can determine whether certain information associated with the network ID has been changed within a predetermined time interval. Such changes can indicate potentially fraudulent activity. Based on the presence or absence of recent changes in the information associated with the network ID, the access to the restricted access application server is either authorized or denied.

While the foregoing is directed to embodiments of the present invention, other and further embodiments of the invention may be devised without departing from the basic scope thereof, and the scope thereof is determined by the claims that follow.

We claim:

1. A computer-implemented method of authorizing a user activity based on a network identification (ID) of a mobile device, that has been activated, the method comprising:

receiving a request from a computing device to initiate a transfer of funds from a restricted-access account on an application server, wherein the request references the network ID;

determining whether or not there is a change of information associated with the network ID during a predetermined time interval by querying a network ID server for the change of information associated with the network ID;

upon determining that the information associated with the network ID has not changed during the predetermined time interval, transmitting a one-time password to the mobile device; and upon receipt of the one-time password from the mobile device, authorizing the transfer of funds, wherein the change of information associated with the network ID is a change in a name for a mobile account associated with the network ID.

2. The computer-implemented method of claim 1, wherein the request from the computing device includes a user name associated with the restricted-access account.

3. The computer-implemented method of claim 1, wherein the request from the computing device includes the network identification ID.

4. The computer-implemented method of claim 1, wherein the request from the computing device includes a user name associated with the restricted-access account and the network identification ID.

5. The computer-implemented method of claim 1, wherein the change of information associated with the network ID is multiple changes in the name for the mobile account associated with the network ID.

6. The computer-implemented method of claim 5, wherein the predetermined time interval is a week.

7. The computer-implemented method of claim 1, wherein the restricted-access account is a bank account.

8. The computer-implemented method of claim 7, wherein the one-time password is transmitted to the mobile device as a text message.

* * * * *